UNITED STATES PATENT OFFICE.

KARL SCHIRMACHER AND FRIEDRICH SCHMIDT, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

ORTHO-OXYMONOAZO DYE.

No. 826,280.  Specification of Letters Patent.  Patented July 17, 1906.

Application filed August 4, 1905. Serial No. 272,630.

*To all whom it may concern:*

Be it known that we, KARL SCHIRMACHER, Ph. D., and FRIEDRICH SCHMIDT, Ph. D., chemists, citizens of the Empire of Germany, residing at Höchst-on-the-Main, Germany, have invented certain new and useful Improvements in the Manufacture of Ortho-Oxymonoazo Dyestuffs, of which the following is a specification.

We have found that by combining the diazo compound of para-chloro-ortho-amidophenol (OH:$NH_2$Cl = 1:2:4) with 1:8:3:6-dioxynaphthalene-disulfonic acid

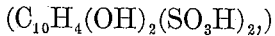

being the so-called "chromotropic" acid, a valuable monoazo dyestuff may be obtained which yields beautiful blue shades of great fastness when fixed as chrome-lake on chrome-mordanted wool or when dyed on unmordanted wool and developed subsequently with chromates.

The manufacture of the dyestuff is as follows: Diazotized para-chloro-ortho-amidophenol is combined with chromotropic acid in strong caustic alkaline solution or in presence of hyhrate of lime.

The composition of the dyestuff in the form of the sodium salt is shown by the following formula:

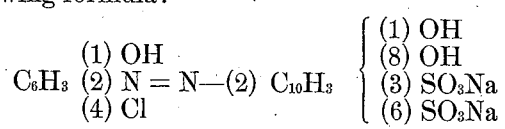

Example: 14.3 kilograms of chloro-ortho-amidophenol are dissolved in water while adding thirty kilograms of hydrochloric acid of about 20° Baumé and diazotized with 6.9 kilograms of nitrate. The diazo solution containing partly the separated diazo compound is slowly introduced at ordinary temperature into a solution of thirty-eight kilograms of the disodium salt of chromotropic acid $C_{10}H_4(OH)_2(SO_3Na)_2$, thirty kilograms of finely-divided hydrate of lime having been stirred in. After about six hours the formation of the dyestuff is complete. From the solution the dyestuff may be separated by adding hydrochloric acid and common salt. When dry, it is a dark powder of bronze luster, soluble in water with a bluish-red color, which on adding sodium carbonate becomes blue-violet. In concentrated sulfuric acid the dyestuff is soluble with a blue color. It dyes wool in an acid-bath red, which on subsequent treatment with chromine becomes blue. On chrome-mordanted wool the dyestuff yields a beautiful very fast blue. On treating with tin and hydrochloric acid the dyestuff is reduced to chloroamidophenol and amidochromotropic acid.

Having now described our invention, what we claim is—

As a new product, the ortho-oxymonoazo dyestuff having as sodium salt the following formula:

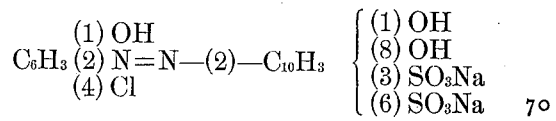

being a dark powder of bronze luster, soluble in water with a bluish-red color, which on adding sodium carbonate becomes blue-violet, while adding dilute hodrochloric acid hardly produces any change in the color; in concentrated sulfuric acid the dyestuff is soluble with a blue color; on reducing with tin and hydrochloric acid the dyestuff is split into para-chloro-amidophenol and amidochromotropic acid; it dyes wool red in an acid-bath; the dyeing of the chrome-lake being blue.

In testimony that we claim the foregoing as our invention we have signed our names in presence of two subscribing witnesses.

KARL SCHIRMACHER.
FRIEDRICH SCHMIDT.

Witnesses:
  ALFRED BRISBOIS,
  BERNHARD LEYDECKER.